United States Patent
Kuo et al.

(10) Patent No.: US 10,747,364 B2
(45) Date of Patent: Aug. 18, 2020

(54) NOISE DETECTION DEVICE, SYSTEM AND METHOD

(71) Applicant: NOVATEK Microelectronics Corp., Hsin-Chu (TW)

(72) Inventors: Hung-Cheng Kuo, Hsinchu (TW); Chun-Hung Chen, Taipei (TW); Chun-Ching Huang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 97 days.

(21) Appl. No.: 15/663,834

(22) Filed: Jul. 31, 2017

(65) Prior Publication Data

US 2017/0351382 A1 Dec. 7, 2017

Related U.S. Application Data (63) Continuation of application No. 14/710,618, filed on May 13, 2015, now Pat. No. 9,766,752, which is a (Continued)

(30) Foreign Application Priority Data

Oct. 31, 2014 (TW) .............................. 103137836 A (51) Int. Cl.
 *G06F 13/38* (2006.01)
 *G06F 3/03* (2006.01)
 *G06F 3/041* (2006.01)

(52) U.S. Cl.
 CPC ............ *G06F 3/0418* (2013.01); *G06F 3/041* (2013.01)

(58) Field of Classification Search
 CPC .............................. G06F 13/38; G06F 3/0418
 See application file for complete search history.

(56) References Cited

U.S. PATENT DOCUMENTS 9,013,195 B2* 4/2015 Kremin ................. G06F 3/0418
 324/658
9,285,902 B1* 3/2016 Kremin .................... G06F 3/044
(Continued)

FOREIGN PATENT DOCUMENTS

CN 101840295 A 9/2010
CN 102289321 A 12/2011
(Continued)

OTHER PUBLICATIONS

Kanjilal, Partha Pratim; Adaptive Prediction and Predictive Control; Dec. 2, 1995; The Institution of Engineering and Technology; p. 206-210; https://books.google.com/books?id=h5H5voqjNIQC&pg=PA210#v=onepage&q&f=false (Year: 1995).*

*Primary Examiner* — David E Martinez
(74) *Attorney, Agent, or Firm* — Winston Hsu (57) ABSTRACT

A noise detection device includes a drive circuit, a sense circuit and a controller. The drive circuit drives a plurality of drive lines having a first polarity pattern and a second polarity pattern, wherein an operation of the first polarity pattern and the second polarity pattern substantially equals zero over a predetermined time period. The sense circuit senses a plurality of sense signals from at least one sense line during the predetermined time period. The controller derives a magnitude of a noise signal from the at least one sense line according to the sense signals.

27 Claims, 10 Drawing Sheets

Related U.S. Application Data continuation-in-part of application No. 14/607,031, filed on Jan. 27, 2015, now Pat. No. 10,289,245, which is a continuation-in-part of application No. 14/285,604, filed on May 22, 2014, now abandoned, said application No. 14/710,618 is a continuation-in-part of application No. 14/285,604, filed on May 22, 2014, now abandoned.

(60) Provisional application No. 62/019,433, filed on Jul. 1, 2014.

(56) References Cited

U.S. PATENT DOCUMENTS

| | | | |
|---|---|---|---|
| 2011/0063993 A1* | 3/2011 | Wilson | G06F 3/044 370/254 |
| 2012/0249433 A1 | 10/2012 | Deng | |
| 2012/0293445 A1 | 11/2012 | Crandall | |
| 2014/0225856 A1* | 8/2014 | Shepelev | G06F 3/0418 345/174 |
| 2014/0361998 A1 | 12/2014 | Gau | |
| 2015/0301631 A1 | 10/2015 | Mirfakhraei | |

FOREIGN PATENT DOCUMENTS

| | | |
|---|---|---|
| CN | 103064563 A | 4/2013 |
| CN | 103400564 A | 11/2013 |
| TW | 201248482 A1 | 12/2012 |
| TW | 201322070 A1 | 6/2013 |
| TW | 201403435 A | 1/2014 |

* cited by examiner

NOISE DETECTION DEVICE, SYSTEM AND METHOD

CROSS REFERENCE TO RELATED APPLICATIONS

This application is a continuation application of U.S. application Ser. No. 14/710,618, filed on May 13, 2015 and entitled "Method of Determining Touch Event in Touch Detection System". U.S. application Ser. No. 14/710,618 is a continuation-in-part application of U.S. application Ser. No. 14/607,031, filed on Jan. 27, 2015 and entitled "TOUCH APPARATUS, TOUCH CONTROLLER THEREOF AND NOISE DETECTION METHOD", and a continuation-in-part application of U.S. application Ser. No. 14/285,604, filed on May 22, 2014 and entitled "NOISE DETECTION DEVICE, SYSTEM AND METHOD", wherein U.S. application Ser. No. 14/607,031 is a continuation-in-part application of U.S. application Ser. No. 14/285,604 and further claims the benefit of U.S. Provisional Application No. 62/019,433, filed on Jul. 1, 2014. The contents of these applications are incorporated herein by reference.

BACKGROUND OF THE INVENTION

1. Field of the Invention

The present invention relates to a method of determining a touch event in a touch detection system, and more particularly, to a method of determining a touch event in a touch detection system with the usage of initial digital operation.

2. Description of the Prior Art

In recent years, touch sensing technology advances rapidly, and many consumer electronic products such as mobile phones, GPS navigator systems, tablets, personal digital assistants (PDA) and laptops are equipped with touch sensing functions. In various electronic products, touch sensing functions are included in a display area which originally had only display functions. In other words, an original display panel is replaced by a touch panel having both display and touch sensing functions. The touch panel can generally be divided into out-cell, in-cell and on-cell touch panel according to the difference in structure of the touch panel. The out-cell touch panel is composed of an independent touch panel and a general display panel. In the in-cell and on-cell touch panel, a touch sensing device is directly disposed on inside and outside of a substrate in the display panel, respectively.

Touch sensing techniques can be classified into a resistive type, capacitive type and optical type. The capacitive type touch panels became popular gradually since they have many advantages such as high sensing accuracy, high transparency, high reaction speed and long life. In a general capacitive touch detection system, a plurality of capacitors are deployed on a touch panel or touch screen for touch detection. The conventional touch detection method requires an entire determination for determination of occurrence of touch events, locations of the touch events and touch strengths. For example, when a touch event occurs, a touch control module may perform interpolation on sensing signals from different capacitors on the touch panel, to determine the location of the touch event. In this manner, the value of each sensing signal should be obtained with a high resolution to determine the touch magnitude in each place of the touch panel, in order to achieve accurate determination. This requires longer time and larger power consumption of the touch detection system.

In addition, there are noises existing in the sensing signals, e.g., liquid crystal module (LCM) noises, and these noises may reduce the report rate of touch events. In order to achieve a preferable report rate, the conventional noise detection and error correction method always applies a powerful filter to filter out these noises. The powerful filter may possess a narrow bandwidth to pass through the desired signals, where the narrow bandwidth corresponds to long time consumption in time domain. Alternatively, the touch control module may perform complex analog operations on the sensing signals to eliminate or reduce the interferences generated by noises.

However, the above entire determinations always require complex circuit design, higher power consumption and more time expense, and thereby reduce the performance of the touch detection system. Thus, there is a need to provide a preferable solution of signal processing and operations for touch sensing signals, to enhance the performance of the touch detection system.

SUMMARY OF THE INVENTION

It is therefore an objective of the present invention to provide a method of determining a touch event in a touch detection system with the usage of initial digital operation. In this manner, the touch detection may achieve the benefits of reduced time and power consumption of the touch detection system.

The present invention discloses a noise detection device, which comprises a drive circuit, a sense circuit and a controller. The drive circuit drives a plurality of drive lines having a first polarity pattern and a second polarity pattern, wherein an operation of the first polarity pattern and the second polarity pattern substantially equals zero over a predetermined time period. The sense circuit senses a plurality of sense signals from at least one sense line during the predetermined time period. The controller derives a magnitude of a noise signal from the at least one sense line according to the sense signals.

The present invention further discloses a noise detection system, which comprises a touch panel and a noise detection device. The touch panel comprises a plurality of drive lines and at least one sense line. The noise detection device comprises a drive circuit, a sense circuit and a controller. The drive circuit drives a plurality of drive lines with a first polarity pattern and a second polarity pattern, wherein an operation of the first polarity pattern and the second polarity pattern substantially equals zero over a predetermined time period. The sense circuit senses a plurality of sense signals from the at least one sense line during the predetermined time period. The controller derives a magnitude of a noise signal from the at least one sense line according to the sense signals.

The present invention further discloses a method of detecting noise signals. The method comprises driving a plurality of drive lines with drive signals having a first polarity pattern and a second polarity pattern, wherein an operation of the first polarity pattern and the second polarity pattern substantially equals zero over a predetermined time period; sensing a plurality of sense signals from at least one sense line during the predetermined time period; and deriving a magnitude of a noise signal from the at least one sense line according to the sense signals.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, the conventional entire determinations are time consuming and need more power. It is desired to provide a preferable method of touch detection, to determine a touch event in a touch detection system. In general, a touch control module of the touch detection system may transmit driving signals to the capacitors on the touch screen or touch panel, and receive sensing signals from the capacitors to determine whether a touch event occurs. A threshold value corresponding to the sensing signals may be pre-defined for the determination of touch events.

Figure 1:
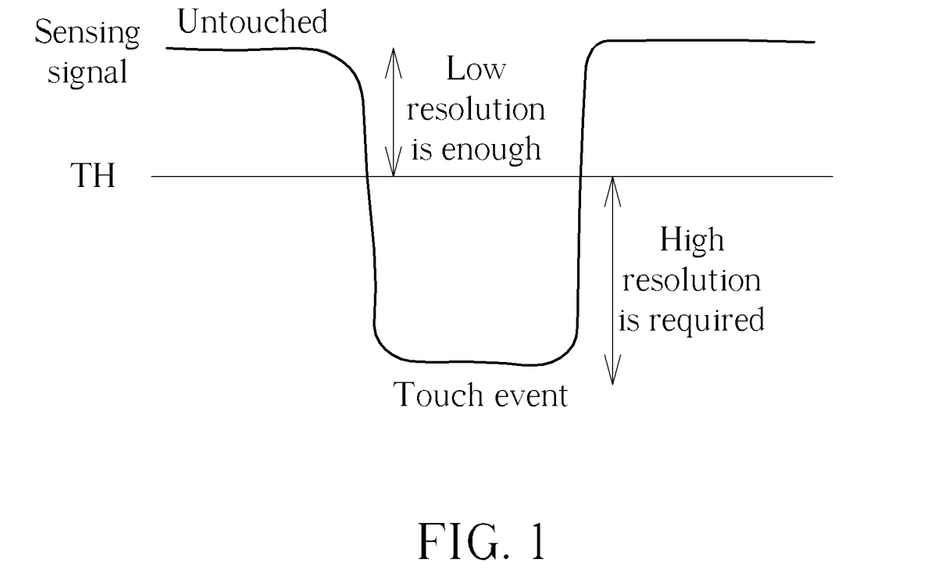
FIG. 1 is a waveform diagram illustrating determination of touch events via a sensing signal.

Please refer to FIG. 1, which is a waveform diagram illustrating determination of touch events via a sensing signal. FIG. 1 includes a threshold value TH and a sensing signal. If the sensing signal is lower than the threshold value TH, a touch event is determined to occur; otherwise, the touch panel may be untouched.

As shown in FIG. 1, if the sensing signal indicates an occurrence of touch event, a high resolution on the sensing signal is required. More specifically, the obtained signal value should be accurate and different signal values of different sensing signals are incorporated to determine further touch information, such as the location of the touch event and the touch strength. In such a condition, an entire determination is required to calculate the touch information. On the other hand, if the sensing signal indicates that there is no touch event, the entire determination may not be required. Furthermore, the determination of touch event via the threshold value TH without further determination only requires a low resolution. A simple operation is enough to deal with the low resolution determination, since there are only two determination results which can be represented by one bit. In such a condition, the entire determination with higher resolution is necessary only when a touch event is determined to occur.

Figure 2:
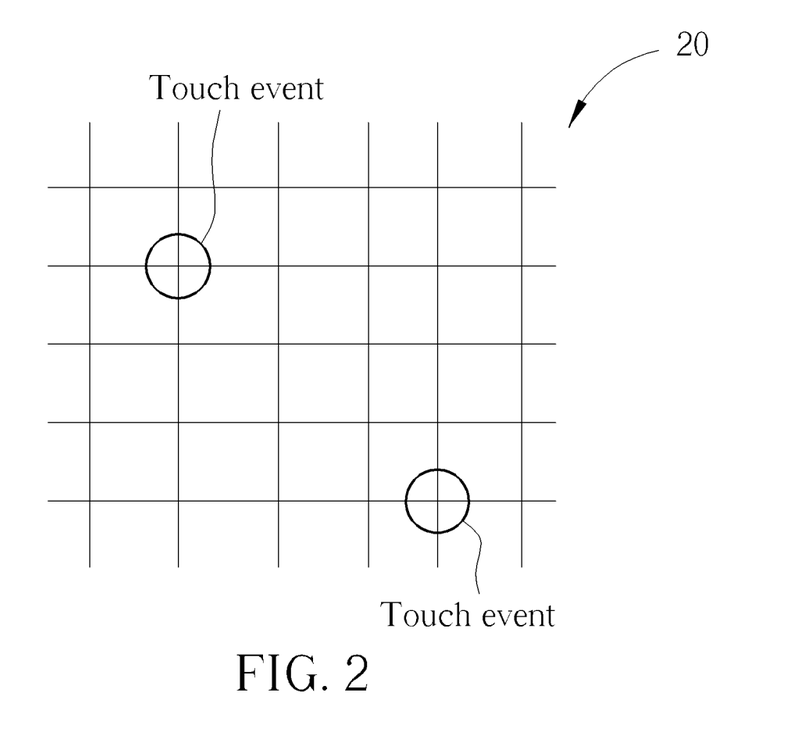
FIG. 2 is a schematic diagram of touch events on a touch panel.

Please refer to FIG. 2, which is a schematic diagram of touch events on a touch panel 20. As shown in FIG. 2, the touch event occurs at two points on the touch panel 20. In general, within an entire touch panel, there is always only one or few points where a touch event is detected, or even no touch event is detected. For most places without touch events, the entire determination with higher resolution may not be necessary.

As can be seen, from time viewpoint, the touch events only occur in partial time during a period. From space viewpoint, the touch events only occur in partial space within an entire touch panel. Therefore, for most time and in most space, an initial digital operation with lower resolution is enough to deal with signal processing of sensing signals, where the entire determination with higher resolution is not necessary.

The initial digital operation enjoys the benefits of simplified circuit structure, reduced power consumption and less time expense. However, the simplified initial digital operation results in weak noise detection capability. Fortunately, U.S. application Ser. No. 14/607,031 and U.S. application Ser. No. 14/285,604 provide an effective noise detection method without the usage of powerful filters (which include a complex circuit and cost a lot of time). In addition, the interferences of several regular noises can be eliminated or reduced by using non-uniform sampling. These noise detection and noise reduction methods allow the simplified initial digital operation to be feasible in the touch detection system.

Figure 3:
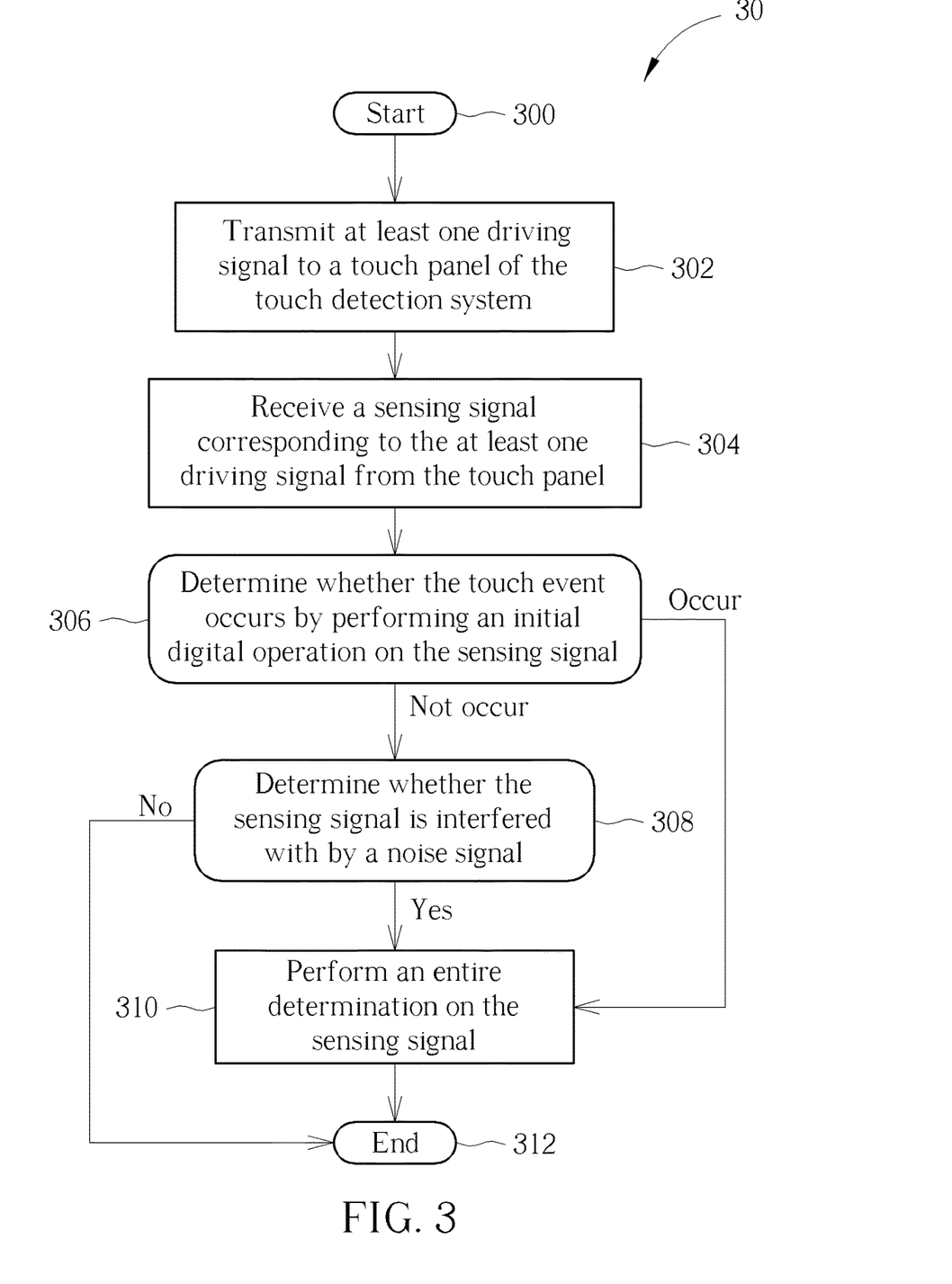
FIG. 3 is a schematic diagram of a touch detection process according to an embodiment of the present invention.

Please refer to FIG. 3, which is a schematic diagram of a touch detection process 30 according to an embodiment of the present invention. The touch detection process 30 may be realized in any touch control module for any type of touch detection system such as a resistive type, capacitive type or optical type touch detection system. The touch detection process 30 includes the following steps:

Step 300: Start.

Step 302: Transmit a plurality of driving signals to a touch panel of the touch detection system.

Step 304: Receive a sensing signal corresponding to the plurality of driving signals from the touch panel.

Step 306: Determine whether the touch event occurs by performing an initial digital operation on the sensing signal. If the touch event occurs, go to Step 310; otherwise, go to Step 308.

Step 308: Determine whether the sensing signal is interfered with by a noise signal. If yes, go to Step 310; otherwise, go to Step 312.

Step 310: Perform an entire determination on the sensing signal.

Step 312: End.

According to the touch detection process 30, the touch control module transmits a plurality of driving signals to a touch panel of the touch detection system and receives a sensing signal corresponding to the plurality of driving signals from the touch panel. The touch control module then determines whether a touch event occurs by performing an initial digital operation on the sensing signal. The initial digital operation may be performed via a simple comparison between the sensing signal and a threshold (such as the threshold value TH shown in FIG. 1) without a further determination of other touch information such as touch strength, signal magnitude and touch location. Therefore, in the step of performing the initial digital operation, the touch control module may know whether a touch event occurs, but may not obtain entire information related to the touch event, e.g., the location of the touch event.

If the comparison result of the initial digital operation indicates that the touch event occurs, the touch control module then performs the entire determination on the sensing signal, in order to obtain entire information to determine the touch location and/or touch strength; that is, a higher resolution operation with more time consumption is performed in this step. Otherwise, if the comparison result of the initial digital operation indicates that there is no touch event, the touch control module may further determine whether the sensing signal is interfered with by a noise signal. If the noise signal interfering in the sensing signal is detected, the touch control module may also initiate the entire determination for the sensing signal, in order to eliminate or reduce the noise interferences and then determine the touch location and/or touch strength if the touch event occurs. If there is no noise signal detected, the touch control module may not perform the entire determination on the sensing signal. In such a condition, time and power consumption may be saved since the entire determination is not necessary.

As can be seen, the entire determination with higher resolution and higher time consumption is performed when the touch event is determined to occur or the sensing signal is determined to be interfered with by the noise signal. In other words, if the touch event is not determined to occur and the sensing signal is not determined to be interfered with by the noise signal, the entire determination may be omitted.

Furthermore, as mentioned above, for most time and in most places on a touch panel, the entire determination is not necessary. Therefore, in contrast to the conventional touch control module which performs the entire determination for all received sensing signals, the present invention applies the entire determination only when the initial digital operation indicates that there is a touch event or the noise detection method indicates that there is a noise. In an embodiment, the entire determination may include a signal processing scheme with the usage of a large filter, to filter out or eliminate any possible noises. In another embodiment, the entire determination may include a maximum likelihood operation to estimate the touch strength corresponding to each sensing signal, so that the touch control module may accurately calculate the touch location and/or touch strength. Since the entire determination (e.g., the large filter or the maximum likelihood operation) provides a much higher resolution for touch determination than the initial digital operation, the operation time required by the entire determination may be much higher than the operation time required by the initial digital operation. Thus, the benefits of less time and power consumption will be achieved with less usage of the entire determination according to the touch detection process 30.

It should be noted that the order of Step 306 and Step 308 may be interchanged. That is, the touch control module may determine the occurrence of touch event after determining the presence of noise signal. In such a condition, the entire determination may still be performed if any of the noise signal and the touch event occurs.

In general, the noise signals of a touch detection system may be classified into two types: regular noises and irregular noises. In order to avoid false reporting of touch information, both the regular noises and irregular noises should be eliminated or reduced. The irregular noises may be dealt with by the noise detection method described in U.S. application Ser. No. 14/607,031 and U.S. application Ser. No. 14/285,604, and the regular noises may be eliminated in the initial digital operation by using non-uniform sampling. The regular noises may be any types of noises generated by several regular operations in an electronic system incorporated with the touch detection system, such as the liquid crystal module (LCM) noises or other artificial noises in a liquid crystal display (LCD) system. For example, the regular noises may be generated by a circuit device in the LCD system. When generating a noise signal, the circuit device may send the information related to the time when the noise signal arrives at the sense lines on the touch panel. Therefore, the touch detection system will know that the regular noise interferences may exist in which place(s) of the sensing signal.

Figure 4A:
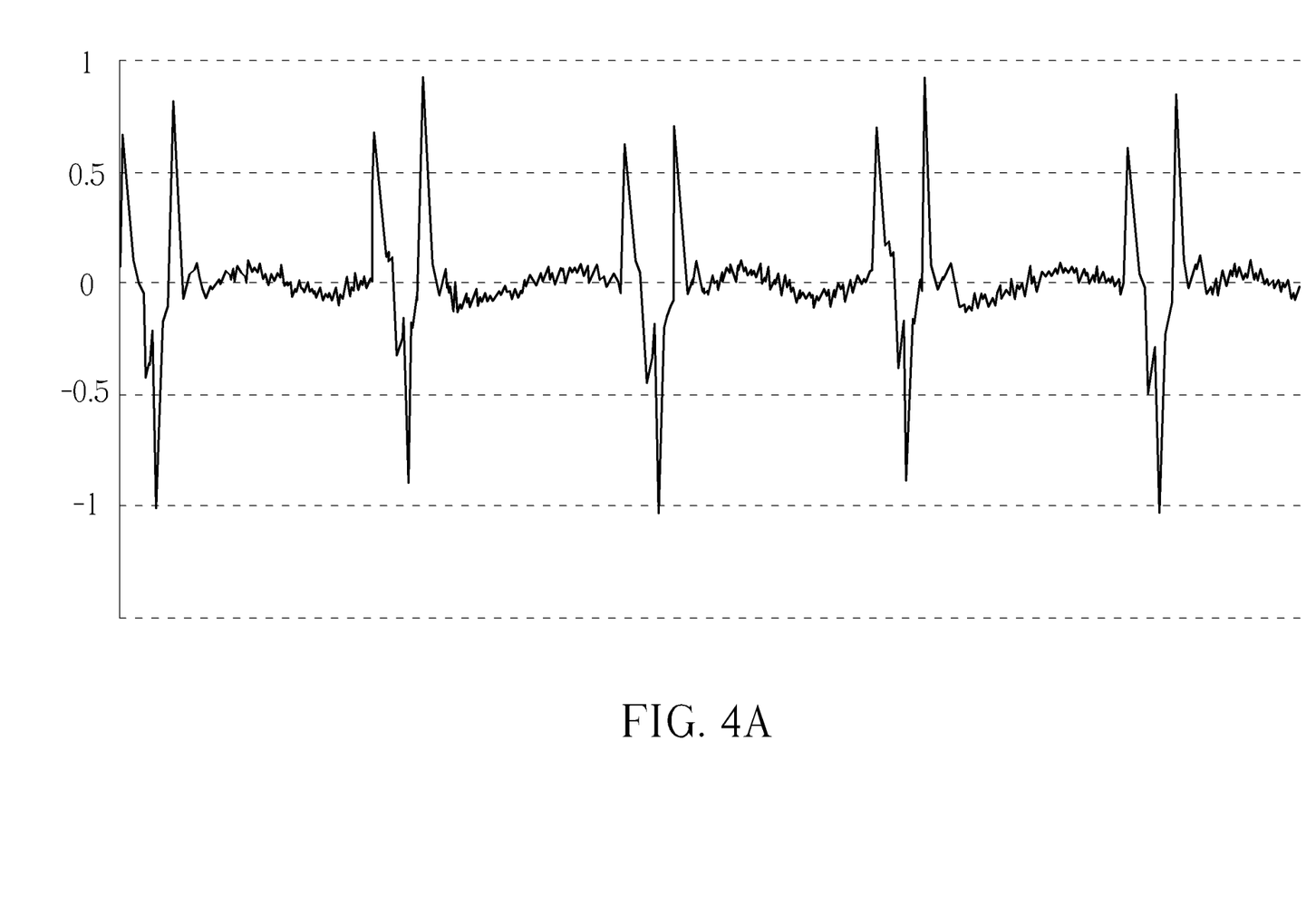
FIG. 4A and FIG. 4B are schematic diagrams of non-uniform sampling for a sensing signal interfered with by regular noise signals.
Figure 4B:
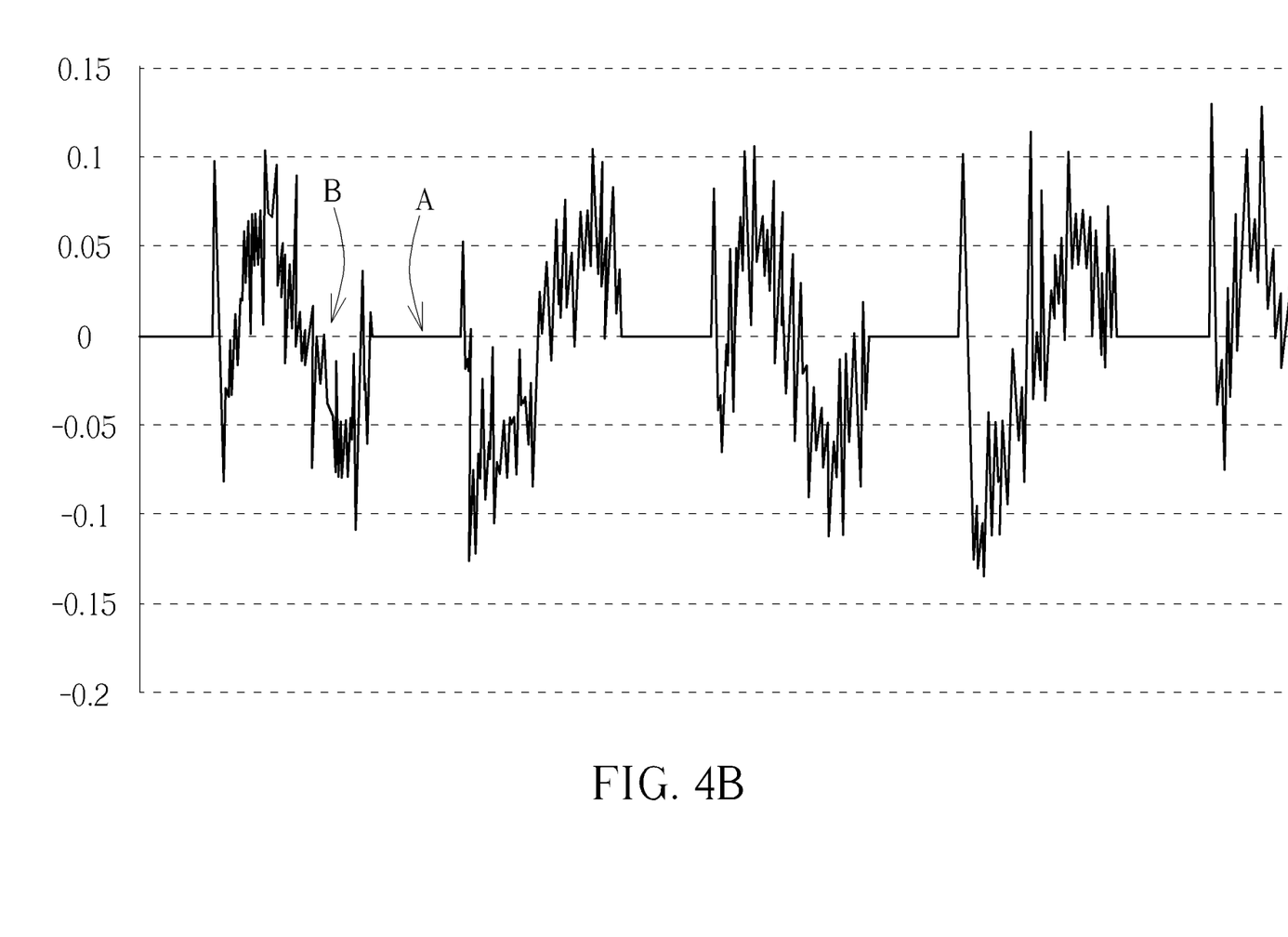

Please refer to FIG. 4A and FIG. 4B, which are schematic diagrams of non-uniform sampling for a sensing signal interfered with by regular noise signals. FIG. 4A illustrates the sensing signal with several noise signals regularly appearing, and FIG. 4B illustrates the same sensing signal after undergoing the non-uniform sampling. As shown in FIG. 4A, the value of the sensing signal is substantially between −0.1 and 0.1, and is severely interfered with by the noise signals, which may range from −1 to 1. It is obvious in FIG. 4A that the noise signals on the sensing signal influence the determination results of touch events. According to the non-uniform sampling, at least one fragment of the sensing signal may be deleted before the sensing signal is sampled, wherein the deleted fragment is interfered with by a regular noise. In other words, since the touch detection system knows the places where the noise interferences exist, the non-uniform sampling is able to eliminate parts of the sensing signal interfered with by the noise signals, as shown in FIG. 4B. Only parts of the sensing signal which are not interfered with by the noise signals are sampled.

Please note that the conventional signal processing scheme used in the entire determination usually deals with signals in frequency domain, where a powerful filter is always required to eliminate noise signals. In such a condition, if the applied filter is more powerful, more time consumption will be required. Different from the conventional entire determination, the initial digital operation of the present invention uses the non-uniform sampling to eliminate regular noise interferences in time domain. In this manner, the initial digital operation is much simpler and may solve the noise problems with less time consumption and circuit complexity. For example, in an embodiment, the non-uniform sampling may be realized by a multiplexer, which has two input terminals, one output terminal and one control terminal controlled by a control signal. One of the input terminals receives the sensing signal and the other receives a zero voltage. During the period when the sensing signal is interfered with by the regular noises (e.g., the point A), the control signal may control the multiplexer to output the zero voltage; during the period when the sensing signal is not interfered with by the regular noises (e.g., the point B), the control signal may control the multiplexer to output the sensing signal. In other embodiments, the non-uniform sampling may also be realized by other methods, and is not limited herein.

Figure 5:
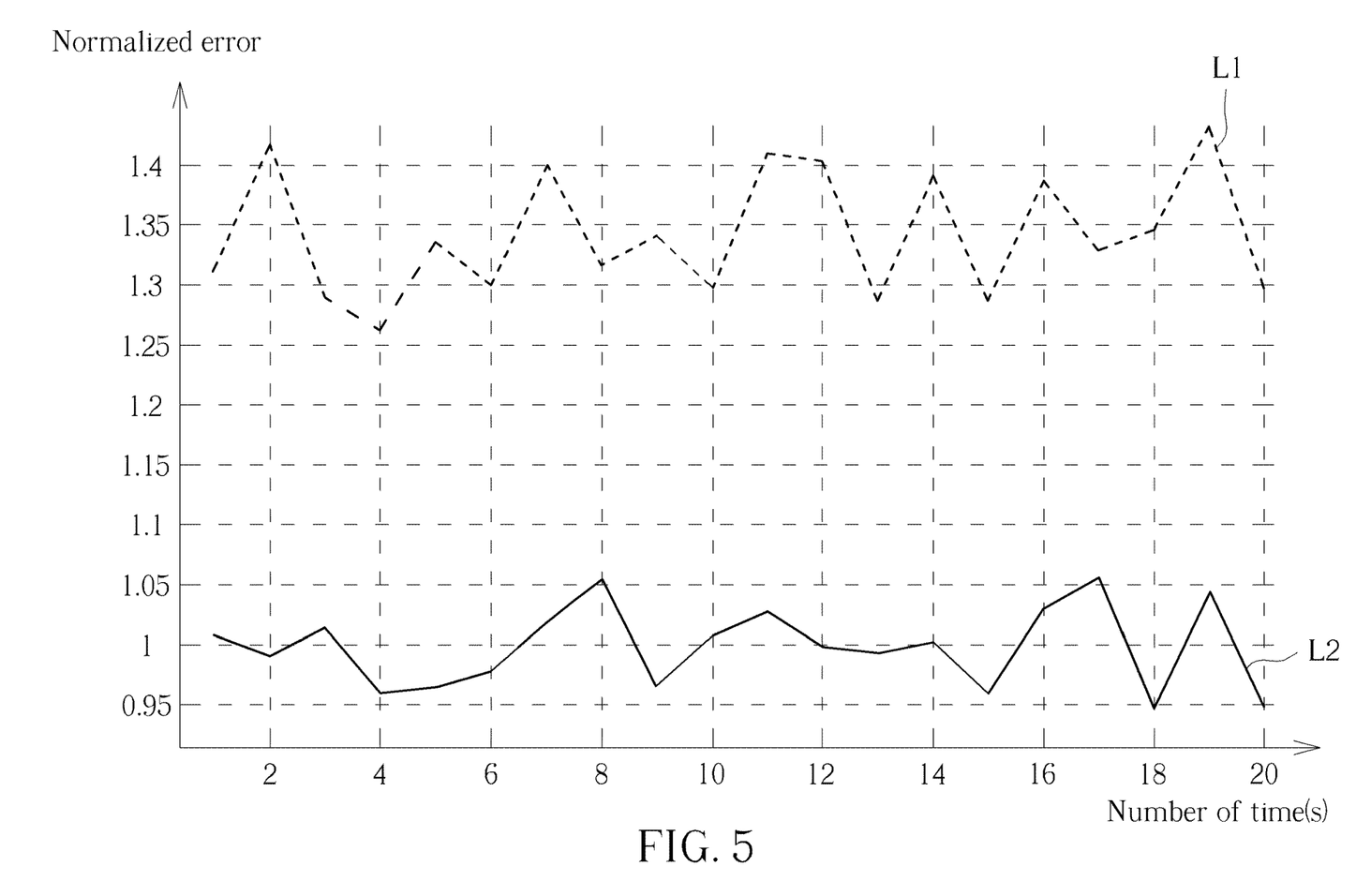
FIG. 5 illustrates line graphs showing a normalized error in the sampling results of the sensing signals interfered with by noises.

Please refer to FIG. 5, which shows the benefits originating from the non-uniform sampling described above. FIG. 5 illustrates line graphs showing a normalized error in the sampling results of the sensing signals interfered with by noises, where the value 1 stands for an accurate sampling result and the values 1.1, 1.2, 1.3 and 1.4 stand for an error of 10%, 20%, 30% and 40% on the sampling result of the sensing signal, respectively. Line L1 corresponds to a sensing signal before undergoing the non-uniform sampling, and line L2 corresponds to the sensing signal after undergoing the non-uniform sampling. As shown in FIG. 5, the sampling results may possess 30%~40% errors due to noise interferences. After the non-uniform sampling is implemented, the errors may significantly decrease to 0%~5%. As can be seen, the non-uniform sampling is powerful for error reduction. In addition, since the magnitude of the error is reduced to a ratio approximately equal to one eighth, the sensing signal may be amplified by eight times before entering the analog-to-digital converter (ADC) of the touch control module. The dynamic range of the ADC may increase 3 bits accordingly, which is a significant improvement over the performance of the ADC.

An operation of the non-uniform sampling may be described by a general form equation as follows:

$$\frac{\sum_t [R(t) \times \text{sequence}(t)]}{\sum_t [g(t) \times \text{sequence}(t)]} = \frac{\sum_t [A \times g(t) \times \text{sequence}(t)]}{\sum_t [g(t) \times \text{sequence}(t)]} + \frac{\sum_t [\text{noise}(t) \times \text{sequence}(t)]}{\sum_t [g(t) \times \text{sequence}(t)]},$$

wherein R(t) denotes the sensing signal and is divided into a signal part A×g(t) and a noise part noise(t), g(t) is a basic signal such as a basic sine wave or a basic square wave, and sequence(t) denotes a sequence of time frames remained after at least one fragment of the sensing signal is deleted. The deleted fragment (s) may be the part (s) of the sensing signal interfered with by noises. As illustrated by the general form equation, the sensing signal may be divided into the signal part and noise part, where the noise part may be eliminated by applying appropriate sequence(t).

Figure 6:
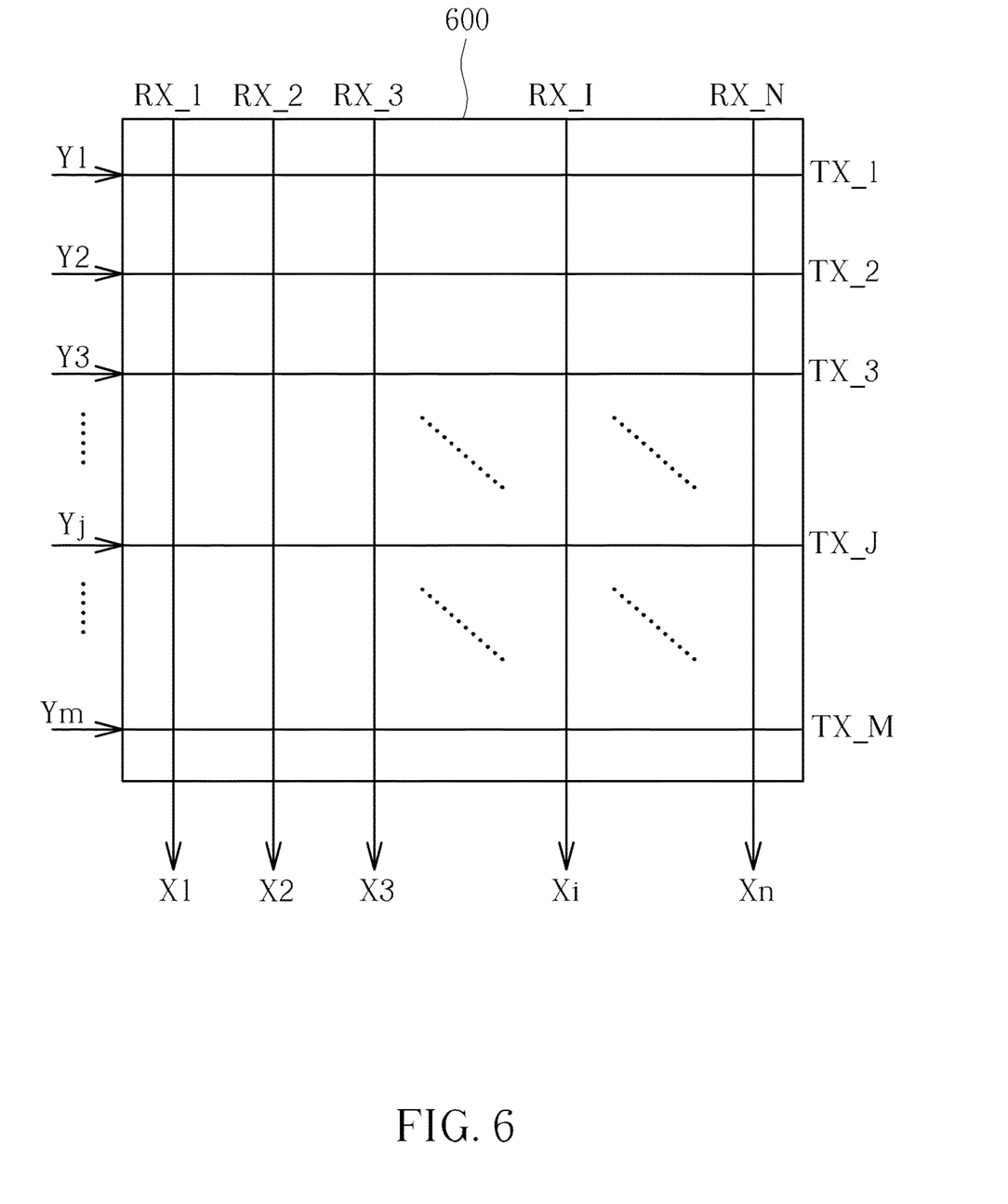
FIG. 6 is a schematic diagram of a touch panel according to an embodiment of the present invention.
Figure 7:
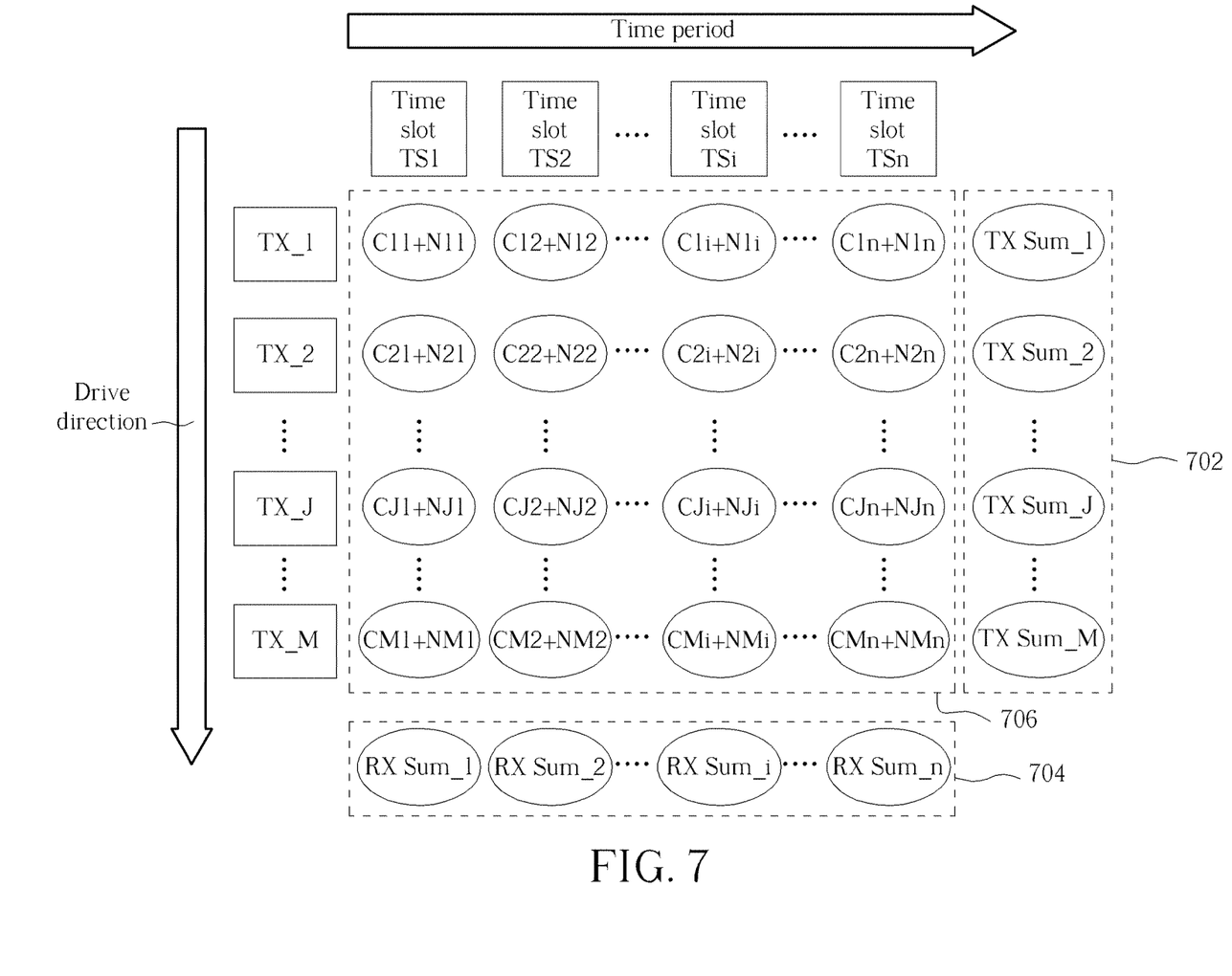
FIG. 7 is a schematic diagram illustrating a data distribution when the touch panel is driven according to an embodiment of the present invention.

In addition, the noises those cannot be eliminated by the non-uniform sampling (e.g., irregular noises) may be detected via the noise detection method described in U.S. application Ser. No. 14/607,031 and U.S. application Ser. No. 14/285,604. Please refer to FIG. 6 and FIG. 7, wherein FIG. 6 is a schematic diagram of a touch panel 600 according to an embodiment of the present invention, and FIG. 7 is a schematic diagram illustrating a data distribution when the touch panel 600 is driven. As shown in FIG. 6, the touch panel 600 includes a plurality of driving lines TX_1-TX_M and a plurality of sensing lines RX_1-RX_N for sensing a touch gesture on the touch panel 600, where M and N are positive integers greater than 1. In a time period having a specific time length, a drive circuit of the touch panel 600 transmits a plurality of driving signals Y1-Ym to the driving lines TX_1-TX_M to drive the sensing lines RX_1-RX_N to generate a plurality of sensing signals X1-Xn, in which m and n are positive integers greater than 1.

With reference to FIG. 7, the horizontal axis represents a time period having time increasing from left to right, and the vertical direction represents a drive direction of the touch panel 600, with the driving line TX_1 scanning to the driving line TX_M from top to bottom. In the present embodiment, the time period includes a plurality of time slots TS1-TSn. In a region 706, a data Cji+Nji corresponding to each intersection of the driving lines TX_1-TX_M and the sensing lines RX_1-RX_N represents a summation of a capacitance value Cji generated by the touch gesture and a noise signal Nji generated by outside factors, in which j is a positive integer from 1 to M, i is a positive integer from 1 to n, and M and n are positive integers greater than 1. The noise signal Nji includes noises those cannot be eliminated by the non-uniform sampling such as irregular noises. In region 704, the summation signals RX Sum_1-RX Sum_n corresponding to the locations of the sensing lines RX_1-RX_N of FIG. 6 represent the summations obtained by a touch control module respectively calculating the signal values of the sensing signals X1-Xn in this time period. In other words, the summation signal RX Sum_i represents a summation of the data obtained by the sensing line RX_I from each of the driving lines TX_1-TX_M in the time slot Tsi of this time period, in which I is a positive integer from 1 to N. For example, the summation signal RX Sum_1 represents a summation of C11+N11 to CM1+NM1 in the time slot TS1 of this time period. The summation signals RX Sum_1-RX Sum_n may be described by the following equation:

$$RX\ \text{Sum}\_i = \sum_{j=1}^{M} Cji + Nji$$

in which RX Sum_i represents the summation signals, Cji represents the capacitance value generated by the touch gesture, Nji represents the noise signals generated by the touch panel 600 due to outside factors, in which j is a positive integer from 1 to M, i is a positive integer from 1 to n, and M and n are positive integers greater than 1.

In the present embodiment, each of the driving signals Y1-Ym has a first polarity pattern and a second polarity pattern. In this time period, an operation of the first polarity pattern and the second polarity pattern of each of the driving signals Y1-Ym substantially equals zero. In this example, the operation of the first polarity pattern and the second polarity pattern of each of the driving signals Y1-Ym may be to obtain a summation thereof. In other words, in a region 702, the summations TX Sum_1-TX_Sum M of each of the driving signals Y1-Ym corresponding to the locations of the driving lines TX_1-TX_M of FIG. 6 are respectively zero, which means that in this time period, the summation of the first polarity pattern and the second polarity pattern of each of the driving signals Y1-Ym substantially equals zero.

An illustrative example below has four driving signals Y1-Y4. In the present embodiment, in a time period having two time slots TS1 and TS2, the polarity distribution states of each of the driving signals Y1-Y4 may be as shown in Table 1:

TABLE 1

|     | TX_1 (Y1) | TX_2 (Y2) | TX_3 (Y3) | TX_4 (Y4) |
| --- | --- | --- | --- | --- |
| TS1 | −1 | 1  | 1  | −1 |
| TS2 | 1  | −1 | −1 | 1  |

In Table 1, "1" represents the driving signals Y1-Y4 has the first polarity pattern in the corresponding time slots, and "−1" represents the driving signals Y1-Y4 has the second polarity pattern in the corresponding time slots. Therefore, in the column of the driving line TX_1, after the time period having the two time slots TS1 and TS2 has passed, the summation of the first polarity pattern and the second polarity pattern of the driving signal Y1 of the driving line TX_1 substantially equals to zero. The polarity distribution states of the driving signals Y2-Y4 of the driving lines TX_2-TX_4 may be similarly interpreted by analogy. In addition, the polarity distribution pattern of each of the driving signals Y1-Y4 is not limited to the pattern shown in Table 1. Other examples are illustrated in U.S. application Ser. No. 14/607,031 and U.S. application Ser. No. 14/285,604, and will not be narrated herein.

With reference to FIG. 6, FIG. 7 and the driving schemes disclosed in the embodiments of Table 1, the touch control module of the touch panel 600 respectively calculates a summation of the signal values of the sensing signals X1-Xn in the time period having the specific time length, so as to obtain the summation signals RX Sum_1-RX Sum_n. Thereafter, the touch control module calculates the summation signals RX Sum_1-RX Sum_n to obtain a summation NF of the summation signals RX Sum_1-RX Sum_n, that is, $$NF = RX\ Sum\_1 + RX\ Sum\_2 + \ldots + RX\ Sum\_(n-1) + RX\ Sum\_n = \sum_{j=1}^{M}\sum_{i=1}^{n} Nji.$$

The summation NF obtained by the touch control module calculating the summation signals RX Sum_1-RX Sum_n represents the noise signals generated by the touch panel 600 due to outside factors. Therefore, by using the noise detection method, the noise signals due to outside factors can be rapidly and accurately evaluated.

As can be seen, without the noise signals, the summation of the first polarity pattern and the second polarity pattern of the driving signal substantially equals zero irrespective of the existence of touch event on the touch panel 600. Therefore, the summation NF with any values other than zero may be regarded as noise interferences. The noise signals can thereby detected in this manner. For example, Step 308 of the touch detection process 30 may be realized by the abovementioned touch detection method in accordance with the summation NF. If the summation NF equals zero, the sensing signal may be determined to be without any noise. If the summation NF does not equal zero, the sensing signal may be determined to be interfered with by a noise signal, so that the entire determination should be applied to deal with the noise signal. In another embodiment, the touch control module may further predetermine a threshold value for the summation NF. The sensing signal may be determined to be interfered with by a noise signal if the summation NF exceeds the threshold value.

Figure 8:
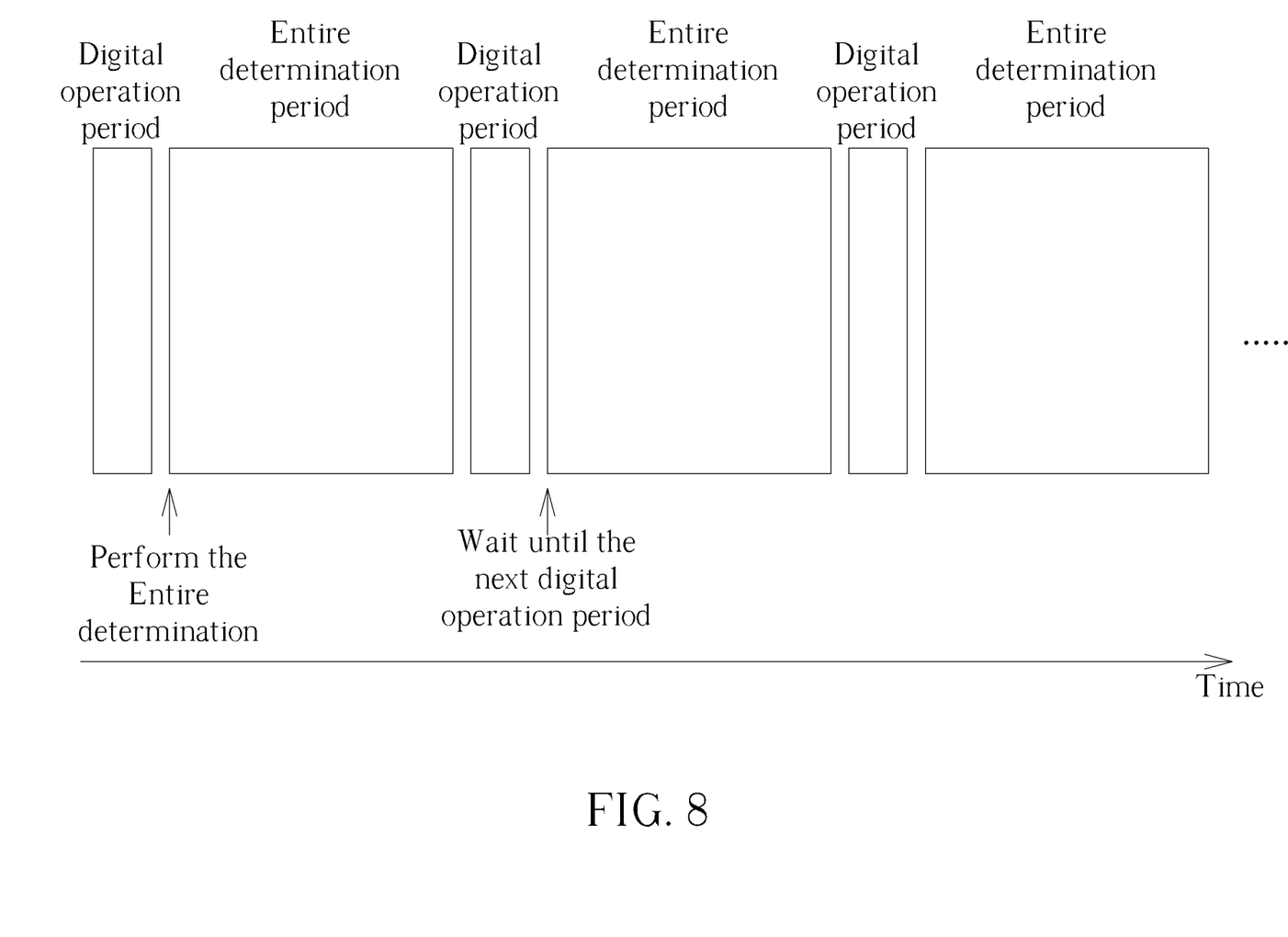
FIG. 8 is a schematic diagram of an operation method of the touch control module performing the initial digital operation and the entire determination according to an embodiment of the present invention.

Please refer to FIG. 8, which is a schematic diagram of an operation method of the touch control module performing the initial digital operation and the entire determination according to an embodiment of the present invention. As shown in FIG. 8, the touch control module is scheduled by reserving a plurality of digital operation periods for performing the initial digital operation and a plurality of entire determination periods for performing the entire determination alternately during a period, where each of the digital operation periods is followed by one of the entire determination periods. In each digital operation period, the initial digital operation with the noise detection method may be performed once. If the initial digital operation or the noise detection method indicates that the entire determination is required due to touch events or noise interferences, the entire determination may be performed in the next entire determination period (as the first entire determination period shown in FIG. 8). If the initial digital operation and the noise detection method indicate that the entire determination is not required since there is no touch event and noise interference, the entire determination may not be performed in the next entire determination period. The touch control module may wait and then perform the initial digital operation until the next digital operation period starts (as the second entire determination period shown in FIG. 8). In this manner, power consumption may be reduced since the entire determination is performed only in few or several periods. This scheduling method is rather simple, but may not be beneficial in time consumption. In another embodiment, when the entire determination is not required, the touch control module may directly perform the next initial digital operation, in order to reduce time consumption.

Please note that, in addition to the signal processing with a large filter and the maximum likelihood operation described above, the entire determination may be realized by including a series of digital operations to achieve higher resolution. More specifically, although one initial digital operation may only obtain low resolution touch detection, high resolution touch detection may still be obtained by performing a series of digital operations.

Figure 9:
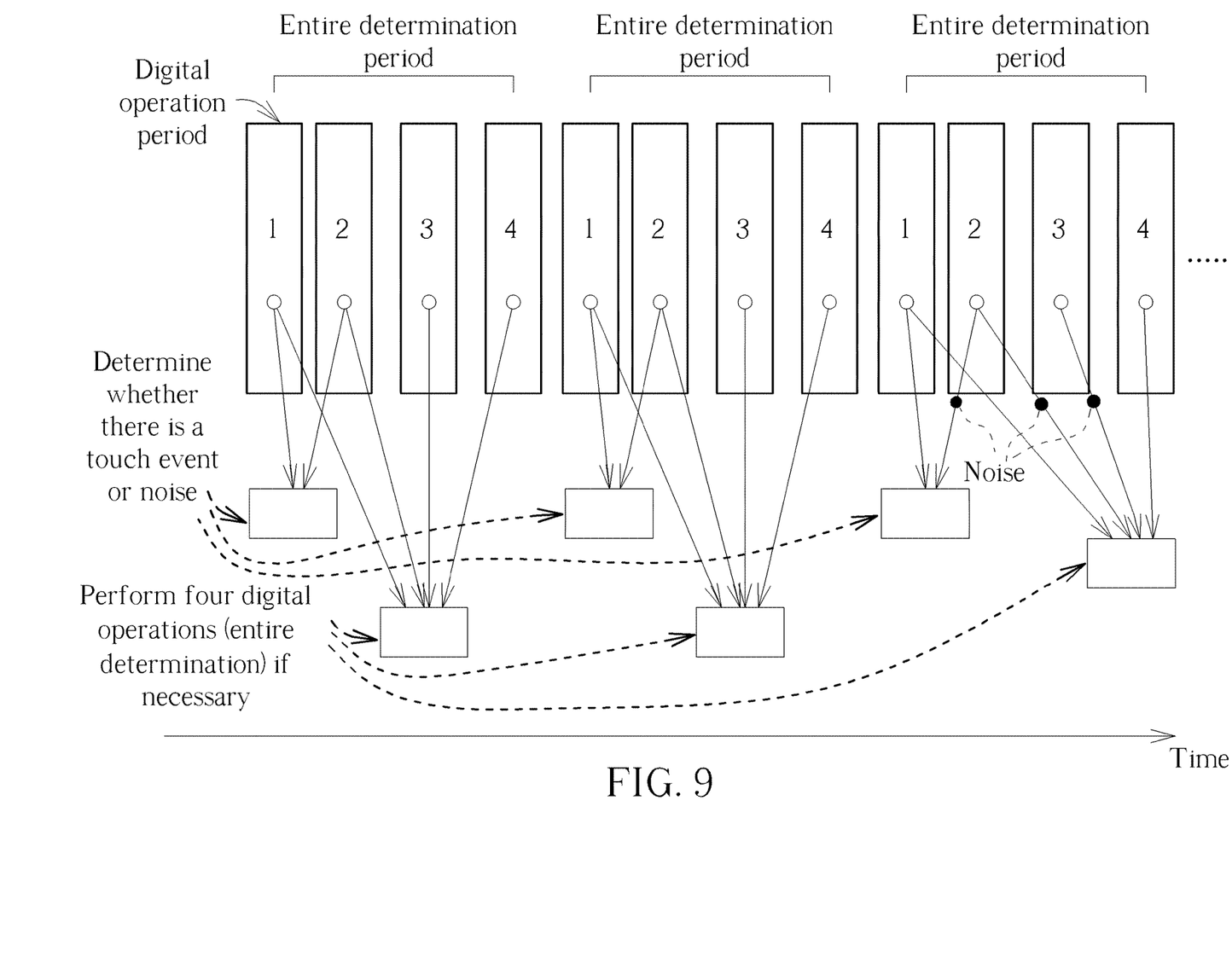
FIG. 9 is a schematic diagram of another operation method of the touch control module performing the initial digital operation and the entire determination according to an embodiment of the present invention.

For example, please refer to FIG. 9, which is a schematic diagram of another operation method of the touch control module performing the initial digital operation and the entire determination according to an embodiment of the present invention. As shown in FIG. 9, an entire determination is composed of four consecutive digital operations the same as or similar to the initial digital operation. In this embodiment, the touch control module may perform the digital operation once or twice to determine whether there is a touch event, and also determine whether the sensing signal is interfered with by noise. Other digital operations may be performed if necessary; that is, when the touch event or the noise signal is detected. For example, in FIG. 9, an entire determination period includes four digital operation periods, each of which allows one digital operation to be performed. The touch control module first performs the digital operation in the first and second digital operation periods, and then determines whether to perform more digital operations according to the determination results obtained in the first and second digital operation periods. Each of the determination results indicates whether a touch event occurs and whether there is a noise signal as indicated by the summation signals obtained from the sensing signals in the abovementioned noise detection method. If there is any touch event or noise signal detected, the touch control module may further perform the digital operation in the third and fourth digital operation periods, in order to obtain the touch location with higher resolution and/or eliminate noise interferences. Otherwise, the additional digital operation in the third and fourth digital operation periods may be omitted.

Please keep referring to FIG. 9, which illustrates how the operation method of a series of digital operations is incorporated with the abovementioned noise detection method. As shown in the third entire determination period of FIG. 9, the touch control module first performs the digital operation in the first and second digital operation periods, and then determines that the determination result of the second digital operation is interfered with by noise. In such a condition, the touch control module further performs the digital operation in the third and fourth digital operation periods. The touch control module then obtains four determination results from the sensing signal corresponding to four digital operations, and determines whether the determination results are interfered with by the noise signal. The touch control module may select to use at least one of the determination results which is not determined to be interfered with by the noise signal to determine the touch information related to the touch event such as the touch location. As shown in the third entire determination period of FIG. 9, the determination results obtained from the second and third digital operations are interfered with by noise, the touch control module thereby selects the determination results obtained from the first and fourth digital operations to determine occurrence of the touch event and/or the touch location.

Please note that, according to the noise detection method described in U.S. application Ser. No. 14/607,031, the summation signals in different time periods may be recombination to obtain another summation NF' with a value smaller than the original summation NF; that is, the summation signals corresponding to the summation NF' may be more immune to noise interference than those corresponding to the summation NF. Please refer to FIG. 6 and FIG. 7 again. First summation signals A, B, C, and D respectively corresponding to the sensing lines RX_1-RX_4 may be obtained in the first time period, and a summation NF3 of the signal values of the first summation signals A, B, C, and D, that is, NF3=A+B+C+D, represents the noise signal value evaluated and obtained by the touch control module after executing the noise detection method for the first time. Thereafter, second summation signals A', B', C', and D' respectively corresponding to the sensing lines RX_1-RX_4 may be obtained in the second time period, and a summation NF4 of the signal values of the second summation signals A', B', C', and D', that is, NF4=A'+B'+C'+D', represents the noise signal value evaluated and obtained by the touch control module after executing the noise detection method for the second time.

In the present embodiment, the touch control module may use at least one second summation signal A', B', C', and D' to replace a part or all of the first summation signals A, B, C, and D, so that a summation NF5 of a signal value of a combination of the second summation signals A', B', C', and D' and the first summation signals A, B, C, and D after recombination is smaller than the summation NF3 of the signal value of the first summation signals before recombination. In this manner, the most preferable summation signals which are not interfered with by noise signals may be determined by finding out the smallest summation after any possible recombination of summation signals is performed. In contrast to removing the determination result with a summation not equal to zero, the recombination and selection method may achieve more accurate determination of touch event and touch location. Note that, in the embodiment illustrated in FIG. 9, although a summation of a plurality of summation signals may appear to be interfered with by noise, several or most of the summation signals included in the summation may still be accurate. The recombination method allows these accurate summation signals to be recombined with other accurate summation signals in other time period(s). In such a condition, more useful data in the summation signals may be preserved, which leads to more accurate touch determination.

Figure 10:
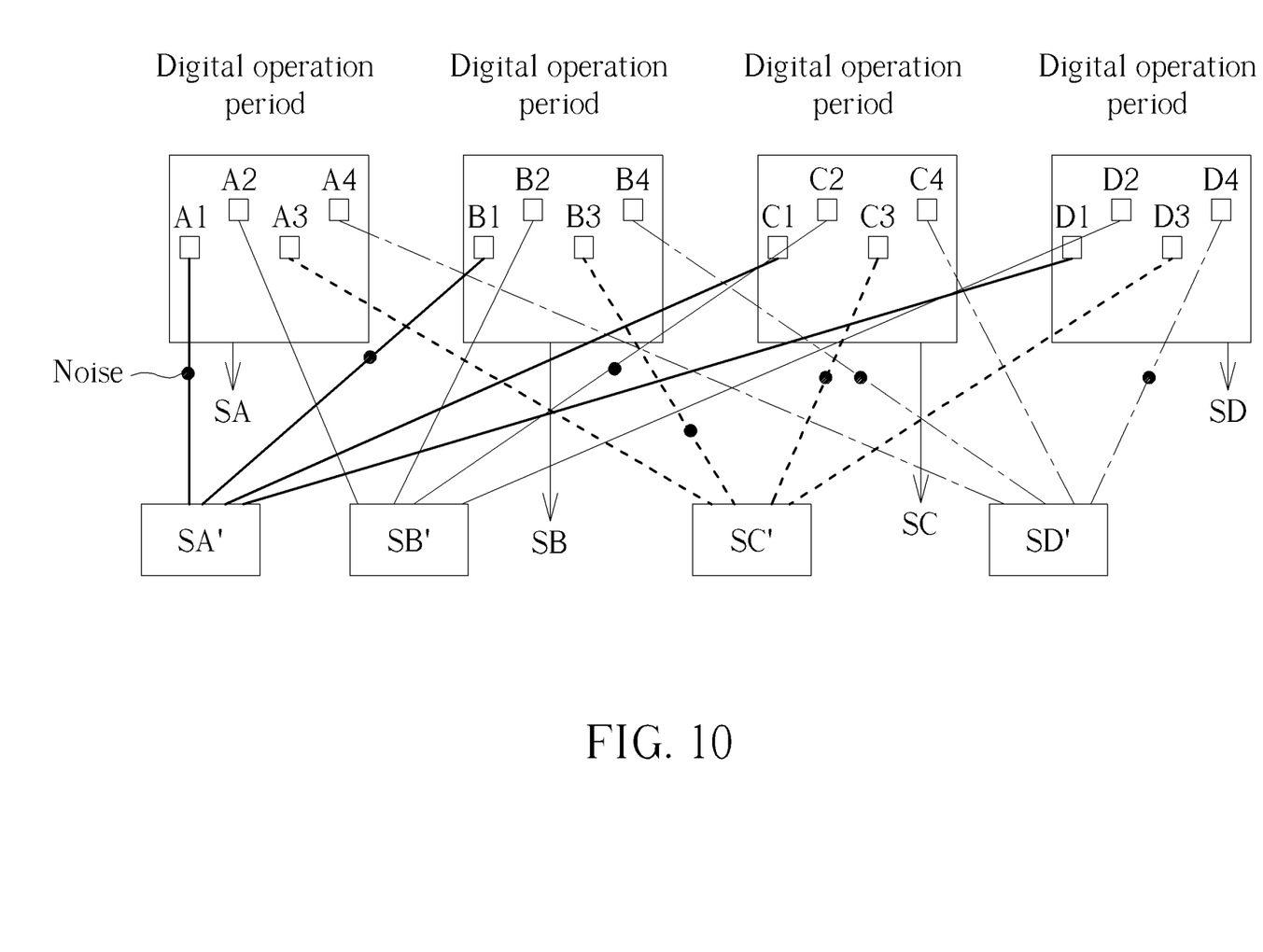
FIG. 10 is a schematic diagram of an operation method of the touch control module performing a series of digital operations with recombination of summation signals.

Please refer to FIG. 10, which is a schematic diagram of an operation method of the touch control module performing a series of digital operations with recombination of summation signals. As shown in FIG. 10, each large block illustrates a digital operation period, which may be regarded as a time period with a determination result indicated by a summation of four summation signals such as summation signals A1-A4, B1-B4, C1-C4 or D1-D4. After the digital operations in the four digital operation periods are performed, the touch control module obtains summations SA, SB, SC and SD respectively corresponding to each digital operation, where SA is equal to the summation of summation signals A1, A2, A3 and A4, SB is equal to the summation of summation signals B1, B2, B3 and B4, SC is equal to the summation of summation signals C1, C2, C3 and C4, and SD is equal to the summation of summation signals D1, D2, D3 and D4. The touch control module then performs the recombination. For example, as shown in FIG. 10, the summation signals A1, B1, C1 and D1 are recombined to obtain a summation SA', the summation signals A2, B2, C2 and D2 are recombined to obtain a summation SB', the summation signals A3, B3, C3 and D3 are recombined to obtain a summation SC', and the summation signals A4, B4, C4 and D4 are recombined to obtain a summation SD'. More specifically, the touch control module may combine any numbers of the summation signals A1-A4, B1-B4, C1-C4 and D1-D4 to obtain a summation. In an embodiment, the touch control module may find out the smallest summation to obtain four or any number of summation signals most immune to noise interference, and select to use these summation signals to determine touch information such as occurrence of a touch event and/or the touch location. Alternatively, the touch control module may find out the summation (s) smaller than a threshold, and obtain the summation signals included in the components of the summation(s). The touch control module then determines the touch information based on the obtained summation signals. As shown in FIG. 10, after several recombination operations, the touch control module may determine that the summation signals A2, A3, A4, B2, C1, C4, D1, D2 and D3 are not interfered with by noise, and thereby select to use these summation signals to determine the touch information. In such a condition, the optimal touch information may be obtained by selecting to use all summation signals which are not interfered with by noise and excluding all summation signals interfered with by noise.

To sum up, the present invention provides a method of determining a touch event in the touch detection system. The conventional entire determination is replaced by the simpler initial digital operation to determine whether the touch event occurs. In order to enhance noise detection capability, the non-uniform sampling is applied to eliminate or reduce regular noises, and a noise detection method with summations of sensing signals having different polarity pattern is introduced to eliminate or reduce irregular noises. The entire determination with more complex circuit, higher resolution and more time and power consumption is applied only if the touch event is determined to occur or the sensing signal is determined to be interfered with by a noise signal according to the initial digital operation. Therefore, the present invention may achieve benefits of reduced time and power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A noise detection device, comprising:
a drive circuit driving a plurality of drive lines with a plurality of drive signals, wherein each of the drive lines is configured to transmit one of the drive signals, and wherein each of the drive signals has a first polarity pattern and a second polarity pattern, and the second polarity pattern is different from the first polarity pattern, and for a first drive line among the drive lines, a summation of the first polarity pattern and the second polarity pattern of the drive signal transmitted on the first drive line equals zero over a predetermined time period;
a sense circuit sensing a plurality of sense signals from a plurality of sense lines respectively corresponding to the sense signals during the predetermined time period; and
a controller deriving a magnitude of a noise signal according to a summation of row data represented by at least one of the sense signals over the predetermined time period, wherein the row data for each of the at least one sense signal is contributed by all of the drive lines.

2. The noise detection device according to claim 1, wherein the drive circuit drives the drive lines with the drive signals having the first polarity pattern and the second polarity pattern, wherein the summation of the first polarity pattern and the second polarity pattern equals zero over the predetermined time period, by applying a first group of drive signals having the first polarity pattern in a first portion of the predetermined time period, and applying drive signals having the second polarity pattern in a second portion of the predetermined time period.

3. The noise detection device according to claim 2, wherein the first polarity pattern and the second polarity pattern sum to zero, and the first portion and the second portion of the predetermined time period are consecutive time slots in the predetermined time period.

4. The noise detection device according to claim 2, wherein the first polarity pattern and the second polarity pattern sum to zero, and the first portion and the second portion of the predetermined time period are consecutive groups of time slots in the predetermined time period.

5. The noise detection device according to claim 2, wherein the first polarity pattern subtracted by the second polarity pattern equals to zero, and the first portion and the second portion of the predetermined time period are consecutive groups of time slots in the predetermined time period.

6. The noise detection device according to claim 1, further comprising:
at least one analog-to-digital converter coupled between the sense lines and the sense circuit, the analog-to-digital converter integrating the sense signals over time in order to convert the analog sense signals to digital sense signals.

7. The noise detection device according to claim 1, wherein the controller derives the magnitude of the noise signal according to the sense signals by summing the sense signals.

8. The noise detection device according to claim 1, wherein the controller derives the magnitude of the noise signal according to whether a summation of the sense signals equals zero.

9. A noise detection system, comprising:
a touch panel comprising a plurality of drive lines and at least one sense line;
a noise detection device, comprising:
a drive circuit driving the plurality of drive lines with a plurality of drive signals, wherein each of the drive lines is configured to transmit one of the drive signals, and wherein each of the drive signals has a first polarity pattern and a second polarity pattern, and the second polarity pattern is different from the first polarity pattern, and for a first drive line among the drive lines, a summation of the first polarity pattern and the second polarity pattern of the drive signal transmitted on the first drive line equals zero over a predetermined time period;
a sense circuit sensing a plurality of sense signals from the a plurality of sense lines respectively corresponding to the sense signals during the predetermined time period; and
a controller deriving a magnitude of a noise signal according to a summation of row data represented by at least one of the sense signals over the predetermined time period, wherein the row data for each of the at least one sense signal is contributed by all of the drive lines.

10. The noise detection system according to claim 9, wherein the drive circuit drives the drive lines with the drive signals having the first polarity pattern and the second polarity pattern, wherein the summation of the first polarity pattern and the second polarity pattern equals zero over the predetermined time period, by applying a first group of drive signals having the first polarity pattern in a first portion of the predetermined time period, and applying drive signals having the second polarity pattern in a second portion of the predetermined time period.

11. The noise detection system according to claim 10, wherein the first polarity pattern and the second polarity pattern sum to zero, and the first portion and the second portion of the predetermined time period are consecutive time slots in the predetermined time period.

12. The noise detection system according to claim 10, wherein the first polarity pattern and the second polarity pattern sum to zero, and the first portion and the second portion of the predetermined time period are consecutive groups of time slots in the predetermined time period.

13. The noise detection system according to claim 10, wherein the first polarity pattern subtracted by the second polarity pattern equals to zero, and the first portion and the second portion of the predetermined time period are consecutive groups of time slots in the predetermined time period.

14. The noise detection system according to claim 9, the noise detection device further comprising:
at least one analog-to-digital converter coupled between the sense lines and the sense circuit, the at least one analog-to-digital converter integrating the sense signals over time in order to convert the analog sense signals to digital sense signals.

15. The noise detection system according to claim 9, wherein the controller derives the magnitude of the noise signal according to the sense signals by summing the sense signals.

16. The noise detection system according to claim 9, wherein the controller derives the magnitude of the noise signal according to whether a summation of the sense signals equals zero.

17. A method of detecting noise signals, the method comprising:
driving a plurality of drive lines with a plurality of drive signals, wherein each of the drive lines is configured to transmit one of the drive signals, and wherein each of the drive signals has a first polarity pattern and a second polarity pattern, and the second polarity pattern is different from the first polarity pattern, and for a first drive line among the drive lines, a summation of the first polarity pattern and the second polarity pattern of the drive signal transmitted on the first drive line equals zero over a predetermined time period;

sensing a plurality of sense signals from a plurality of sense lines respectively corresponding to the sense signals during the predetermined time period; and deriving a magnitude of a noise signal according to a summation of row data represented by at least one of the sense signals over the predetermined time period, wherein the row data for each of the at least one sense signal is contributed by all of the drive lines.

18. The method of detecting noise signals according to claim 17, wherein the step of driving the plurality of drive lines with the plurality of drive signals respectively corresponding to the plurality of data lines comprises:

applying a first group of drive signals having the first polarity pattern in a first portion of the predetermined time period; and applying drive signals having the second polarity pattern in a second portion of the predetermined time period.

19. The method of detecting noise signals according to claim 18, wherein the first polarity pattern and the second polarity pattern sum to zero, and the first portion and the second portion of the predetermined time period are consecutive time slots in the predetermined time period.

20. The method of detecting noise signals according to claim 18, wherein the first polarity pattern and the second polarity pattern sum to zero, and the first portion and the second portion of the predetermined time period are consecutive groups of time slots in the predetermined time period.

21. The method of detecting noise signals according to claim 18, wherein the first polarity pattern subtracted by the second polarity pattern equals to zero, and the first portion and the second portion of the predetermined time period are consecutive groups of time slots in the predetermined time period.

22. The method of detecting noise signals according to claim 17, wherein the step of sensing the sense signals from the sense lines during the predetermined time period comprises integrating the sense signals over time in order to convert the sense signals to digital sense signals.

23. The method of detecting noise signals according to claim 17, wherein the step of deriving the magnitude of the noise signal according to the sense signals comprises summing the sense signals.

24. The method of detecting noise signals according to claim 17, wherein the step of deriving the magnitude of the noise signal according to the sense signals comprises deriving the magnitude of the noise signal according to whether a summation of the sense signals equals zero.

25. A noise detection device, comprising:

a drive circuit driving a plurality of drive lines with a plurality of drive signals, wherein each of the drive lines is configured to transmit one of the drive signals, and wherein each of the drive signals has a first polarity pattern and a second polarity pattern, and for a first drive line among the drive lines, a summation of the first polarity pattern and the second polarity pattern of the drive signal transmitted on the first drive line equals zero over a predetermined time period;

a sense circuit sensing a plurality of sense signals from at least one sense line during the predetermined time period; and a controller deriving a magnitude of a noise signal from the at least one sense line according to whether a summation of the sense signals equals zero.

26. A noise detection system, comprising:

a touch panel comprising a plurality of drive lines and a plurality of sense lines;

a noise detection device, comprising:

a drive circuit driving a plurality of drive lines with a plurality of drive signals, wherein each of the drive lines is configured to transmit one of the drive signals, and wherein each of the drive signals has a first polarity pattern and a second polarity pattern, and for a first drive line among the drive lines, a summation of the first polarity pattern and the second polarity pattern of the drive signal transmitted on the first drive line equals zero over a predetermined time period;

a sense circuit sensing a plurality of sense signals from the at least one sense line during the predetermined time period; and a controller deriving a magnitude of a noise signal from the at least one sense line according to whether a summation of the sense signals equals zero.

27. A method of detecting noise signals, the method comprising:

driving a plurality of drive lines with drive signals with a plurality of drive signals, wherein each of the drive lines is configured to transmit one of the drive signals, and wherein each of the drive signals has a first polarity pattern and a second polarity pattern, and for a first drive line among the drive lines, a summation of the first polarity pattern and the second polarity pattern of the drive signal transmitted on the first drive line equals zero over a predetermined time period;

sensing a plurality of sense signals from at least one sense line during the predetermined time period; and deriving a magnitude of a noise signal from the at least one sense line according to whether a summation of the sense signals equals zero.

* * * * *